United States Patent [19]
Li

[11] Patent Number: 5,686,937
[45] Date of Patent: Nov. 11, 1997

[54] USER INTERFACE SYSTEM AND METHOD FOR CREATING AND REMOVING A SCROLLING ICON FROM A DISPLAY BASED UPON USER PAST AND PRESENT INTERACTION WITH THE ICON

[75] Inventor: Shih-Gong Li, Austin, Tex.

[73] Assignee: International Business Machines Corporation, Armonk, N.Y.

[21] Appl. No.: 413,973

[22] Filed: Mar. 29, 1995

Related U.S. Application Data

[63] Continuation of Ser. No. 143,606, Nov. 1, 1993, abandoned.

[51] Int. Cl.$^6$ .............................................. G09G 5/34
[52] U.S. Cl. .................................... 345/123; 345/121
[58] Field of Search .......................... 345/119, 120, 345/123, 124, 125, 146, 902, 163; 395/155, 156, 157, 159, 161; 364/709.01, 709.1, 709.11, 710.7, 710.08, 710.09, 715.08

[56] References Cited

U.S. PATENT DOCUMENTS

| | | | |
|---|---|---|---|
| 4,586,035 | 4/1986 | Baker et al. | 345/146 |
| 4,752,889 | 6/1988 | Rappaport et al. | |
| 4,813,013 | 3/1989 | Dunn | |
| 4,855,725 | 8/1989 | Fernandez | 345/173 |
| 4,885,699 | 12/1989 | Taoda et al. | |
| 4,899,292 | 2/1990 | Montagna et al. | 395/147 |
| 4,931,783 | 6/1990 | Atkinson | 345/163 |
| 5,062,060 | 10/1991 | Kolnick | |
| 5,091,866 | 2/1992 | Takagi | |
| 5,122,785 | 6/1992 | Cooper | |
| 5,196,838 | 3/1993 | Meier et al. | 345/121 |
| 5,237,651 | 8/1993 | Randall | 395/157 |
| 5,243,697 | 9/1993 | Hoeber et al. | 395/159 |
| 5,289,205 | 2/1994 | Torres | 345/124 |
| 5,339,391 | 8/1994 | Wroblewski et al. | 345/123 |
| 5,485,174 | 1/1996 | Henshaw et al. | 345/123 |
| 5,488,685 | 1/1996 | Palmer et al. | 395/159 |
| 5,500,929 | 3/1996 | Dickinson | 395/159 |
| 5,550,563 | 8/1996 | Matheny et al. | 395/159 |

FOREIGN PATENT DOCUMENTS

| | | |
|---|---|---|
| 61-296469 | 12/1986 | Japan |
| 2-275495 | 11/1990 | Japan |

OTHER PUBLICATIONS

M. A. Wilkes, "Scroll Editing—An On-Line Algorithm for Manipulating Long Character Strings", IEEE Transactions on Computers, vol. C-10, No. 11, Nov. 1970, pp. 1009–1015.

"Dynamic Time Bar with Editing Capabilities", IBM Technical Disclosure Bulletin, vol. 34, No. 8, Jan. 1992, pp. 384–385.

"Dynamic Sizing for Graphical Control Objects", IBM Technical Disclosure Bulletin, vol. 32, No. 9B, Feb. 1990, p. 85.

"Method to Dynamically Adjust a Scrolling", IBM Technical Disclosure Bulletin, vol. 28, No. 2, Jul. 1985, p. 856.

*Primary Examiner*—Richard Hjerpe
*Assistant Examiner*—Paul A. Bell
*Attorney, Agent, or Firm*—Robert M. Carwell

[57] ABSTRACT

In response to user input from a computer pointing device such as a track ball, activation of an icon causes at least one pair of adjacent opposing scroll icons such as arrows to be dynamically created on opposing ends of a display screen. Subsequent selection of either of the arrows causes scrolling of contents of a window in a corresponding respective one of a pair of opposing directions. Required conventional pointing device movement is minimized when alternate scrolling in opposing directions is desired due to the dynamically created arrows being adjacent, whereby conventional traversal of a cursor over large display screen distances between opposing non-adjacent arrows is thereby avoided. In an alternate embodiment, space-apart scroll icons point in opposing directions, whereby activating either arrow dynamically creates an adjacent opposing arrow, thereby completing the arrow pair necessary to scroll in either direction.

12 Claims, 7 Drawing Sheets

PRIOR ART

USER INTERFACE SYSTEM AND METHOD FOR CREATING AND REMOVING A SCROLLING ICON FROM A DISPLAY BASED UPON USER PAST AND PRESENT INTERACTION WITH THE ICON

This is a continuation of application Ser. No. 08/143,606 filed Nov. 1, 1993, now abandoned.

TECHNICAL FIELD

This invention relates to computerized user interfaces, add more particularly, to improved systems and methods for interacting with electronic visual displays such as portable computer screens and the like.

BACKGROUND OF THE INVENTION

Figure 1:
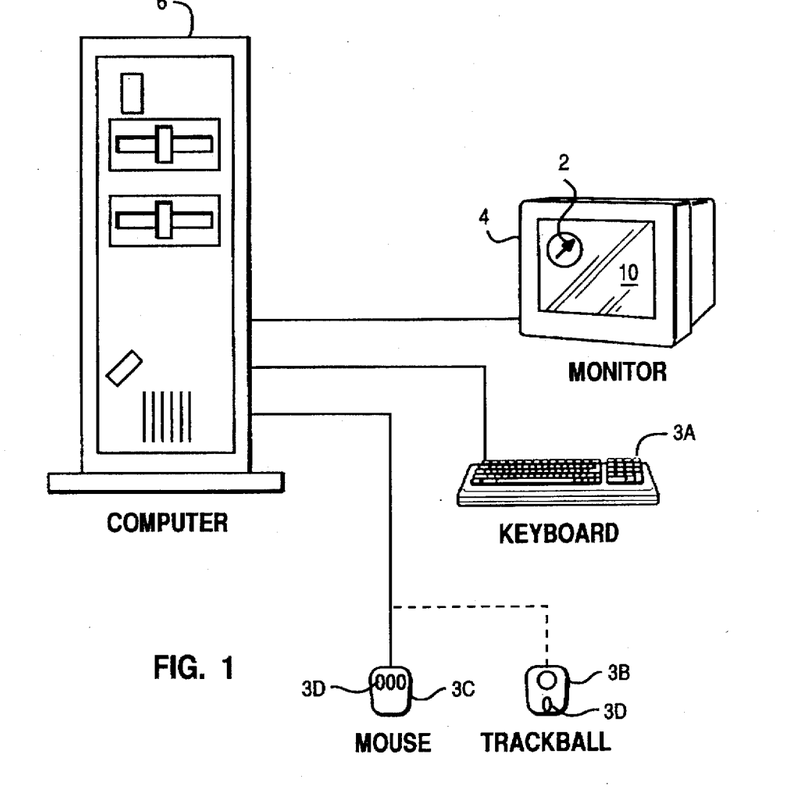
FIG. 1 is an illustration of one environment wherein the system and method of the subject invention may advantageously be implemented.

Electronic user interfaces are typically provided in various systems such as computers, image editors, games, and the like which facilitate the user's interaction with the system by means of pointing devices such as a mouse, joystick, track ball, stylus pad, or the like. In such systems, a display screen such as screen 10 of a monitor 4 in FIG. 1 is employed which provides the user with visual feedback and permits his or her interaction with the system. Such interaction is by means of spatially positioning a cursor 2 on the screen and then indicating a desired action at the cursor location by means of activating a button or the like on the pointing device. These screens are typically provided in a conventional video monitor, or in the case of a notebook, laptop, or other portable computer environment in the form of a relatively small liquid crystal display screen which folds and unfolds as part of the computer.

Figure 3:
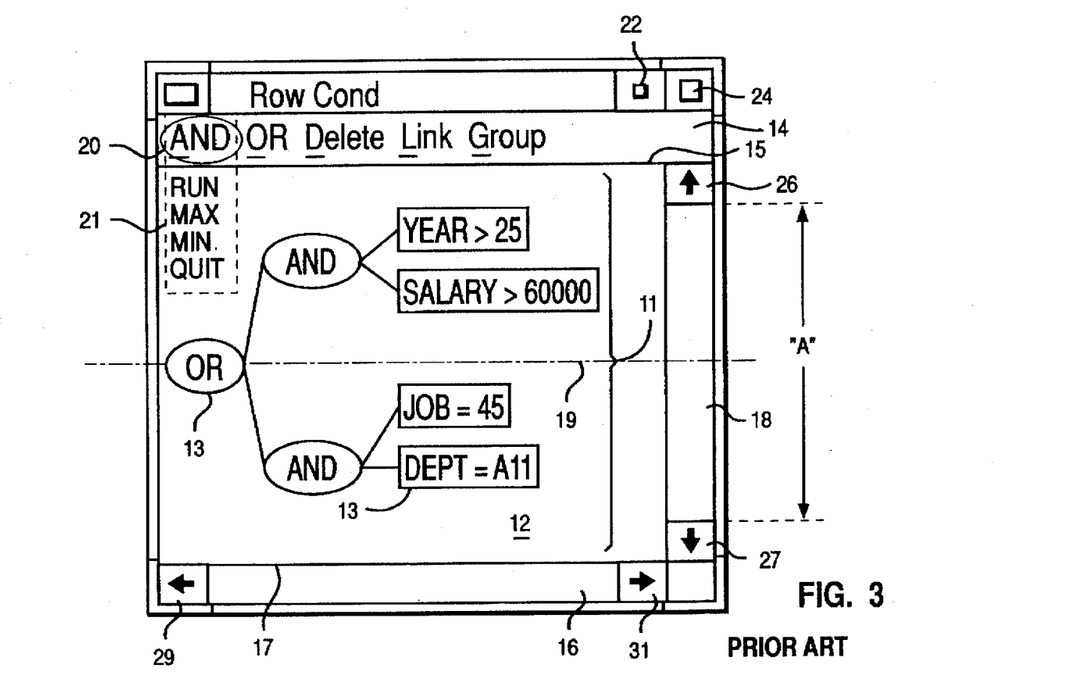
FIG. 3 is an illustration of a prior art user interface providing for user selection of scrolling of windowed data in a computerized graphical interface.

In such instances of a display screen for use in a portable computer environment or other instances when the physical dimensions of the screen itself are severely constrained, various techniques have been developed for controlling the selective display of only a portion of a larger set of data, as by means, for example, of the familiar window 11 of FIG. 3 well known in the art. This window permits only a desired portion of the entire dataset to be displayed on the screen 10. This is typically done by means of various scrolling technologies to be hereinafter described in greater detail.

In such environments, various conventions have been developed with respect to such windows 11 which, for background purposes, will now be described in greater detail with continued reference to FIG. 3. A typical window 11 visible on the display screen 10 will include a title bar 14 and one or more scroll bars such as horizontal scroll bar 16 and vertical scroll bar 18. Various types of data 13 may be displayed in the window 11 such as text and graphics, however such data 13 may typically only appear in the work area 12 e.g. window and not in the title bar 14 or horizontal and/or vertical scroll bar areas 16 and 18.

The title bar 14 typically includes icons or text such that when a cursor 2 is located proximal thereto or on the icon and activated by means of clicking a mouse button or the like, additional actions occur or information appears. For example, positioning the cursor 2 at a location of a pull-down or pop-up menu icon or indicator 20 and clicking a button will cause a corresponding pull-down or pup-up menu 21 to appear on the screen to facilitate additional user interaction with the items appearing in the menu. In like manner, positioning the cursor 2 on a minimize or maximize button 22, 24, respectively, will cause the window 11 to be reduced to an icon on the display screen 10 or conversely will cause the window 11 to fill the entire space available in the display screen 10.

As aforementioned, due to the frequently limited space available in a display screen 10, (particularly in the case of portable computing visual displays such as laptop or notebook computers), various scrolling techniques have been provided in the art. These techniques selectively present at any given time in window 11 only a portion of an entire data set which might include more extensive text, and/or image data in the horizontal and/or vertical screen direction(s). Typically, a scroll bar such as vertical scroll bar 18 is provided having a scroll down arrow 27 and scroll up arrow 26 at the lower and upper portions of the scroll bar 18 respectively. Upon positioning the cursor 2 by means of the pointing device on one of the scroll arrows 26, 27 and activating it by means of a button or the like, the data 13 in the window 11 of the display screen 10 may be caused to move upwards or downwards depending on which arrow was selected such that it disappears from the window 11. Space is thereby freed up for additional information to appear, not unlike a film image scrolling past a window or aperture.

Specifically, as an example, if the scroll up arrow 26 was activated, the data 13 would begin scrolling upward past the upper data boundary 15 of the window 11 and new heretofore unseen data would start moving upwards past the lower data boundary 17 and begin appearing in the window 11 of the display screen 10. Thus, in this manner a technique has been provided for showing large amounts of data on display screen 10 with limited display area, whereby the desired portion of data may be positioned on the screen by alternately activating the up or down scroll arrows selectively, 26, 27, as desired.

In some instances it is, in like manner, desirable to provide for selective display of only a portion of data which would otherwise require a larger display screen in the horizontal direction. In this case the horizontal scroll bar 16 may also be provided with corresponding left and right scroll arrows 29, 31, respectively for similar purposes to those just described for up and down arrows 26, 27.

Whereas the foregoing techniques have addressed to some extent the problems associated with a limited display screen area, the solution has not been entirely satisfactory for numerous reasons. Particularly in portable computing environments, pointing devices must be compact this renders some conventional and widely accepted devices such as mouse-type devices totally inappropriate due to their physical size. Accordingly, other pointing devices have been provided for such uses such as track balls and direction-pressure sensitive keys which provide the steering and activation function for the cursor 2. However, due to physical constraints, this in turn has given rise to several problems.

For example, still referring to FIG. 3, activating the scroll up arrow 26 with such devices may effectively cause the data 13 to scroll through the window 11 upwards as desired. However, when it is desired to reverse the process and scroll downward, this requires traversal of the cursor 2 from a location proximal to the scroll up arrow 26 all the way down to the scroll down arrow 27, thereby traversing the distance "A" in FIG. 3. This might easily be done by providing a pointing device having a sufficiently small "granularity" such that small movement of the pointing device will cause the relatively large traversal across the space A to the desired location on the scroll down arrow 27 of the display screen 10. However, it is precisely this relatively large movement of the cursor 2 in relation to a small movement of the pointing device which gives rise to one of the problems, namely that this large movement of the cursor 2 in the scroll bars may render the cursor essentially useless for interacting with the data 13 in the display screen 10 wherein finer granularity is required.

Figure 4:
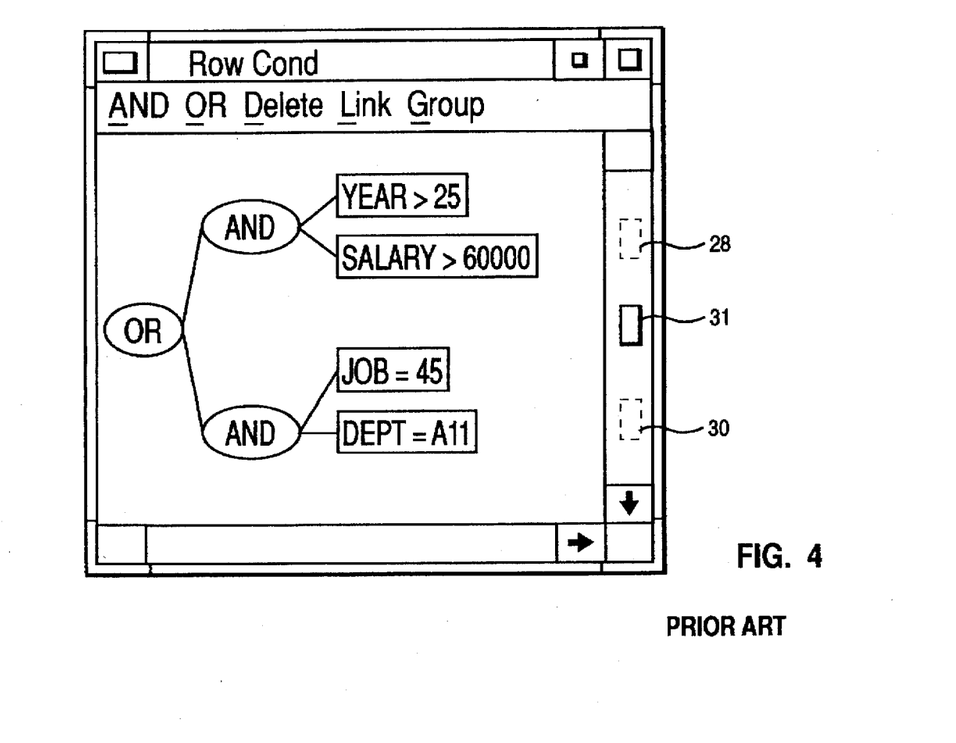
FIG. 4 is an illustration of yet another prior art implementation of a graphical user interface for use in a windowed system providing for user-selected scrolling.

Referring now to FIG. 4, one solution to providing for relatively large scrolling movements in the window 11 while at the same time providing for finer granularity or movement once a desired location in a large amount of data has been arrived at is to provide for a locator icon 31 in the scroll bar area. By locating the cursor 2 on this locator 31 and activating a button or the like, the locator 31 may be dragged such as to position 28 or 30, causing relatively larger traversals of data through the window 11 of the display screen 10. While this provides for large traversals through data, it still does not completely obviate the need to traverse from one end of the scroll bar such as at the scroll up arrow 26 to the opposing end for fine granularity movement of text within the window 11.

Figure 5:
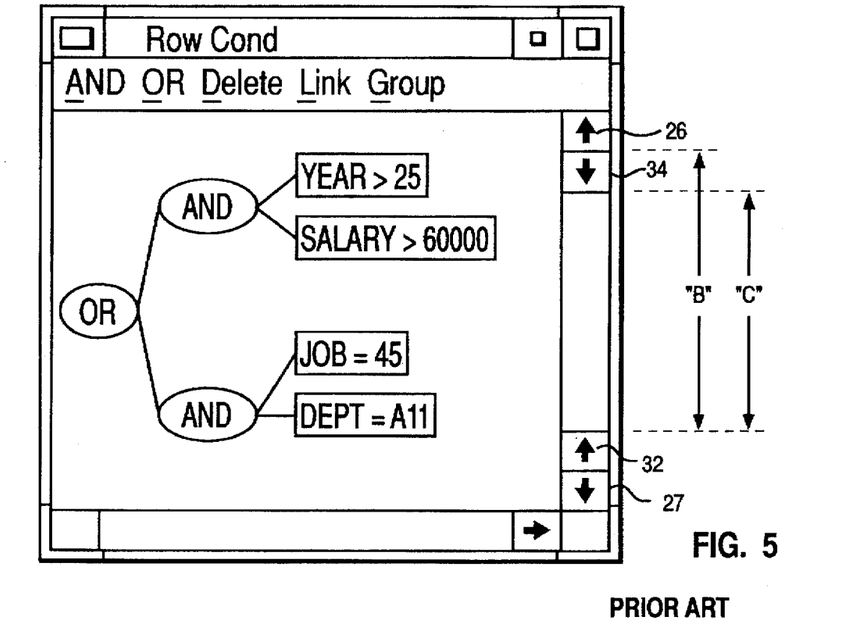
FIG. 5 is an illustration of yet another prior art graphical user interface technique for providing for scrolling in a windowed user interface.

In recognition of this problem, as shown at FIG. 5, the user interface art evolved to the point where an additional arrow such as scroll up arrow 32 is permanently and statically displayed adjacent scroll down arrow 27. With such an arrangement, if the cursor 2 was moved to scroll down arrow 27 and it was thence desired to scroll up, a relatively small traversal of the cursor was required to the adjacent scroll up arrow 32 in order to cause scrolling in the opposite direction, e.g. it was no longer necessary to cause the cursor to traverse a larger distance to the locator 31 or to the upper scroll arrow 26 (which served the same purpose as arrow 32).

It soon became apparent to user interface designers that this was not a complete solution either in providing an adjacent pair of arrows in a scroll bar. This is simply because if, for example, the user then moved the cursor into the window 11 and into an area above the midway axis 19 (FIG. 3) and then desired to scroll downward, he or she would have to once again cause the cursor 2 to traverse a relatively long distance all the way back to the downward scroll arrow 27. It will be recalled that due to the nature of track balls and similar devices suitable to portable computing environments, this, in turn, would cause the unworkable nuisance of having to roll the track ball numerous times to position the cursor 2 at this down scroll arrow 27 if the pointing device was set to some reasonable granularity which could be useful when operating in the window 11.

Accordingly, it was not long before user interface designers arrived an attempted solution of providing a permanent and static additional arrow pair at the opposing end of the scroll bar, such as scroll up arrow 26 and scroll down arrow 34 of FIG. 5. In this manner, no matter which side of the midway axis 19 of FIG. 3 the cursor 2 was positioned on when performing work in the window 11, the user could simply position the cursor to the closest arrow pair 27-32 or 26-34 for scrolling activity as desired in either direction.

However, it became apparent that this approach created yet additional problems, which may be seen illustrated in FIG. 5. A provision for static, permanently displayed double arrow pairs such as arrows 27-32, and/or 26-34 obviously reduced the space previously available for traversal of the locator 31 such that it could now only traverse a distance B (in the case of one arrow pair at one end of the scroll bar and a single arrow at the other end) FIG. 5. Worse yet, the linear space available for traversal by the locator 31 would be even more severely limited to distance C in the case of provision for two pairs of double arrows 27-32 and 26-34 (FIG. 5). This limitation on space between scrolling arrows at opposed ends of a scroll bar in turn severely limited the granularity available to the locator 31 which proved to be unacceptable.

Other approaches in an effort to solve the foregoing problem have included providing for an "acceleration" feature for cursors and their associated pointing devices. In these types of approaches the distance traversed by the cursor 2 will be controlled by the degree of acceleration imparted to the pointing device by the user, with this acceleration profile being in some instances user-configurable and stored in memory. Thus, in operation, if the user were to rapidly move the pointing device such as a track ball a short distance the cursor would in a ballistic manner traverse a farther distance on the display screen 10 than if the user were to displace the track ball an identical distance but with less acceleration.

This, in essence, provides for a variable granularity but it has been found, unfortunately, to be fraught with numerous other problems. First, it is required that the user interact with an acceleration profile to attempt to adjust and tune the movement of the cursor to an appropriate user-specified acceleration and the quirks of individual preference. An appropriate setting of the acceleration unfortunately may vary dependent upon the particular application being run. Moreover, such an approach requires no small degree of skill and manual dexterity on the part of the user to be effective.

From the foregoing, it will be apparent that a user interface system and method was highly desired which could provide for improved usability of window applications particularly in a notebook or other portable computing environment.

More particularly, such an improved user interface was desired in applications having significant display screen size limitations requiring applications wherein a user must shuttle between scrolling up and down or left and right actions.

Still further, such an improved interface was desired which addressed the problem of granularity of track ball and other like positioning or pointing devices wherein it was necessary to locate a cursor at specific locations precisely on the one hand, yet necessary at other times to traverse large arenas of data with such pointing devices.

It was further desired to thus provide for a user interface system adaptable to scroll bar designs employing a track ball or like device to move a cursor from a scroll arrow at one end of a scroll bar to the opposite end while, at the same time maximizing scroll bar space available for positioning of a locator when desired.

These and other objects of the invention have been met by the present invention which will hereinafter be described in further detail, with reference to the following figures wherein:

SUMMARY OF THE INVENTION

In response to user input from a computer pointing device such as a track ball, activation of an icon causes at least one pair of adjacent opposing scroll icons such as arrows to be dynamically created on opposing ends of a display screen. Subsequent selection of either of the arrows causes scrolling of contents of a window in a corresponding respective one of a pair of opposing directions. Required conventional pointing device movement is minimized when alternate scrolling in opposing directions is desired due to the dynamically created arrows being adjacent. In this manner conventional traversal of a cursor over large display screen distances between opposing non-adjacent arrows is thereby avoided when scrolling in alternate directions.

In an alternate embodiment, space-apart scroll icons such as arrows point in opposing directions, whereby activating either arrow dynamically creates an adjacent opposing arrow, thereby completing the arrow pair necessary to scroll in either direction.

Automatic dynamic destruction of the thereby-created arrow(s) completing arrow-pair(s) is also provided for upon detection of occurrence of selected criteria indicating scrolling is no longer realized because other user interface activity is occurring. Such criteria include detection of movement of the pointing device from arrows which exceeds a preselected distance, movement from an arrow at one end of a scrolling bar to that of another end or any other place on the scroll bar, or user action causing the current window to be redrawn (such as selected another window to be the active window, changing the size of the current window), or activating a pull-down or pop-up menu.

Such criteria, in one embodiment, are developed dynamically based upon a history of prior user interaction and behavioral heuristics. A user profile is developed and stored defining and refining the criteria over time. Thus, when the system learns from prior user input that, given a particular application for example, the user typically quickly returns to a scrolling function even though he or she has previously exceeded the predefined distance from the arrow (which would otherwise indicate and cause destruction of the dynamically-created arrow), the dynamic destruction of the dynamically created arrow is overridden.

DETAILED DESCRIPTION OF THE PREFERRED EMBODIMENT

Referring first to FIG. 1, a typical system providing the environment for implementing the invention may be seen depicted therein and will first be described. A computer 6 will execute the method of the invention via a program loaded therein implementing the process to be described, wherein the images, icons, and the like are made to be displayed on the display screen 10 of an appropriate monitor 4. Various I/O devices are utilized in conjunction with the computer 6, including a keyboard 3A, and a desired pointing device such as a track ball 3B or mouse 3C utilized for positioning a cursor 2 on the display screen 10. The pointing device will typically include one or more buttons 3D for activating the cursor 2 once it is positioned at the desired location on the display screen 10.

A generalized computer system has been shown in FIG. 1 for purposes of only generally indicating the environment for which the system and method of the subject invention may be advantageously employed. However, as will become apparent from the description which follows, the invention admits to a number of such environments in which it is desirable to control on a limited area display screen 10 a limited portion of a larger data set than is capable of being shown at a given time from the screen 10. Thus, although not shown in FIG. 1, a computer system environment adapted to particularly take advantage of the benefits of the invention will be in the form of a portable computer system such as a laptop, notebook, personal digital assistant, or the like wherein, of necessity, the physical display screen 10 area must be limited.

As a matter of further generality, it can readily be appreciated that the problems addressed by the present invention are not necessarily limited to conventional computer systems, but rather, more generally, made be applied to any such electronic display of data, whether it be text and/or graphic images wherein only a portion of the data desired to be displayed may appear on the screen 10 at a given time. Thus, for example, the invention admits to applications of video editing systems, for example, which may be of a dedicated purpose and thus not thought of as being a general computer system as shown in FIG. 1 in the accepted sense.

Figure 2:
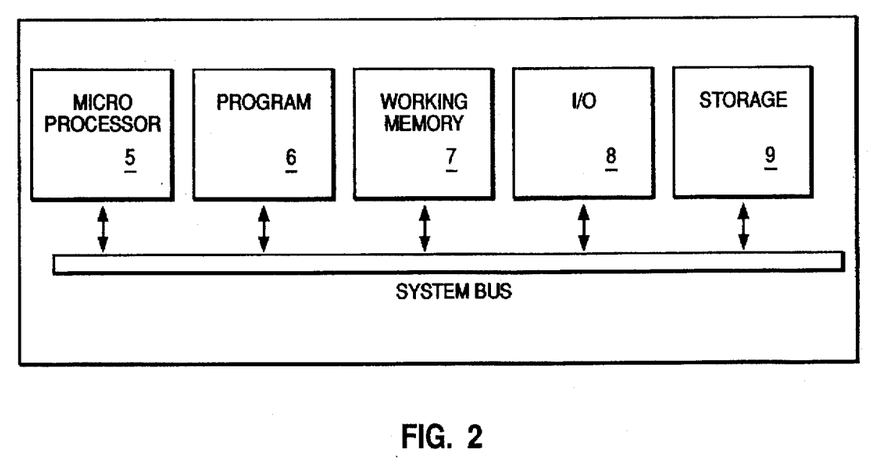
FIG. 2 is a block diagram of a system in accordance with the invention.

Referring now to FIG. 2, inside the computer 6, a system bus is typically provided which ties together the central processing unit or microprocessor 5 and a computer program 6 has to be hereinafter described which instructs the microprocessor 22 to execute steps for effecting the invention. Working memory 7 is also provided which the microprocessor 5 utilizes to store intermediate data, program code, and the like, resulting from execution of the program 6. The program 6 only been shown generally, but it will be readily apparent to one of ordinary skill in the art that this will encompass operating system and device driver code for generally controlling application programs, system memory and I/O and the like as well as further encompassing various application programs running in conjunction with the operating system which result in the various displays of images and data on the display screen 10 and the cursor 2, and other video images described herein.

Still further, the generalized program 6 is intended to functionally represent code necessary for implementing the specific aspects of the invention hereinafter detailed, such as the dynamic creation and extinction of scrolling icons, and the windows associated therewith and their various scroll bars, etc. Additional structural and functional elements comprising the computer system 6 attached to the system bus include generalized I/O 8 for interfacing external components such as the monitor 4 and I/O devices 3A–3C to the computer 6 via the system bus, and mass storage 9 which may take the form of the familiar disk or tape drives or the like providing the function of non-volatile storage to the computer 6 of program code and data as required to implement the invention.

Figure 6:
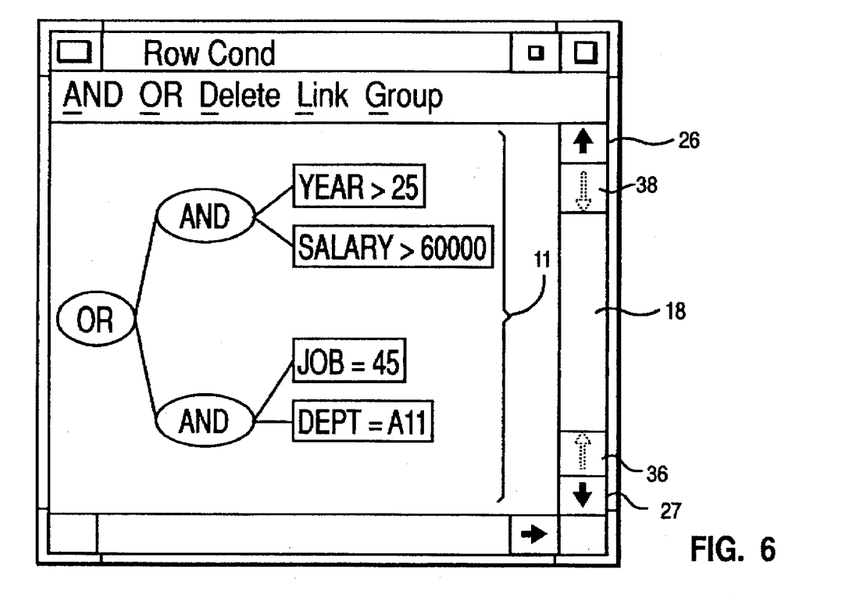
FIG. 6 depicts alternate embodiments of a graphical user interface of the present invention.

Referring now to FIG. 6, there will be seen depicted therein a user interface, and more particularly, a window 11 of the present invention to be employed with a display screen 10 such as that found in a portable laptop or notebook computer or the like.

In accordance with the invention, it will be noted in addition to the conventional scroll up and scroll down arrows 26, 27, respectively shown disposed at opposing ends of the scroll bar such as vertical bar 18, additionally there is shown in dotted line format two additional dynamic scroll arrows 36 and 38. These arrows are shown in dotted format to indicate that normally during operation of a computer application, these dynamic scroll arrows will not be present, thereby providing for availability of the entire linear space "A" along the scroll bar for use by the locator 31, as in the case of the prior art shown in FIG. 3.

It is a feature of the invention that when a scrolling action is desired by the user, the user may position the cursor 2 proximally to either the scroll up or scroll down arrow 26, 27, respectively, depending upon, for convenience, which such arrow is closest to the cursor at that point in time. Thus, for example, if at a given time the cursor 2 is located above the midway axis 19 shown in FIG. 3 on the user space or work area 12 while the user is interacting with a given application, the user would presumably elect to position the cursor 2 at or adjacent the closer upper scroll arrow 26. In like manner, if the cursor was below the midway axis 19, the cursor would be positioned adjacent or on the scroll down area 27.

Upon thereafter activating the pointing device by depressing or clicking a button or the like, it is a feature of the invention that one ore more an additional arrows would thence be dynamically created and displayed at that time such as adjacent to and opposing the arrow which was just-then activated. Specifically, for example, if the cursor 2 was positioned at or adjacent the scroll up arrow 26 and a clicking action was effected, a dynamic scroll down arrow 38 would thereby be created and displayed immediately adjacent the permanent scroll up arrow 26. Additionally, if desired, a dynamically created and displayed scroll up arrow 36 would simultaneously be created and positioned adjacent the permanent scroll down arrow 27 at the lower end of the scroll bar. In one embodiment this is simply because such user interaction indicates the user is in a use mode wherein scrolling is primarily desired such that the cursor after interaction with the user space 12, may be positioned at either arrow pair 26–38 or 27–36 as desired for further scrolling activity.

After the user has thus created dynamically the one or two scroll arrow pairs, he or she may thereafter activate either arrow of either pair by positioning the cursor thereon or adjacent it and activating a button or clicking so as to cause scrolling of the data 13 in the window 11 in the desired direction.

Figure 7:
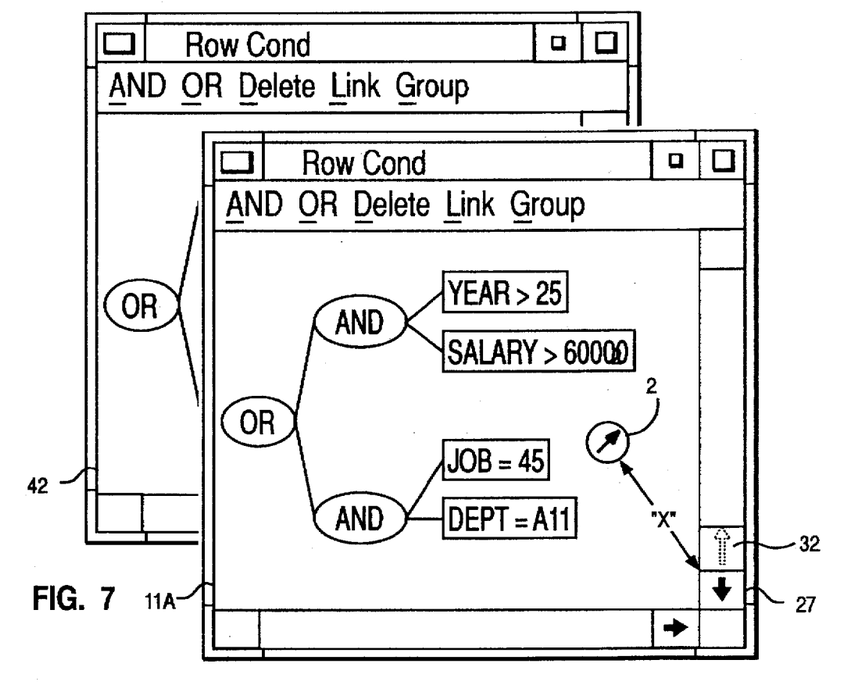
FIG. 7 is an illustration of a graphical user interface in a condition prior to destruction of dynamically created icon(s) in accordance with the invention showing illustrative features of the interface which may trigger such destruction.

Referring now to FIG. 7, it is a feature of the invention that not only are dynamically created scrolling icons or arrow pairs created, but provision is also made in the user interface invention for dynamic destruction of the thus dynamically created icon(s) upon the meeting of predefined criteria.

Referring now to FIG. 7, it will be noted that in conventional modern user interfaces certain applications provide for additional display of icons or the like in the title bar 14, such as the aforementioned pull-down pop-up menus 21 (FIG. 3) upon activating of the appropriate icon 20. One example of such a criteria which would desirably cause dynamic removal of the thus-created additional scroll icons or arrows would be if the user activates such a pull-down or pop-up menu as shown in FIG. 3 by means of positioning and activating the cursor on the corresponding icon such as icon 20 in the title bar. The reason for this is that such user action would indicate scrolling activity was no longer desirable, but rather activation of some other action or function shown in the menu such as minimizing a window (MIN), running another program (RUN), maximizing the window (MAX), or exiting the application (QUIT) (shown in FIG. 3).

Figure 8:
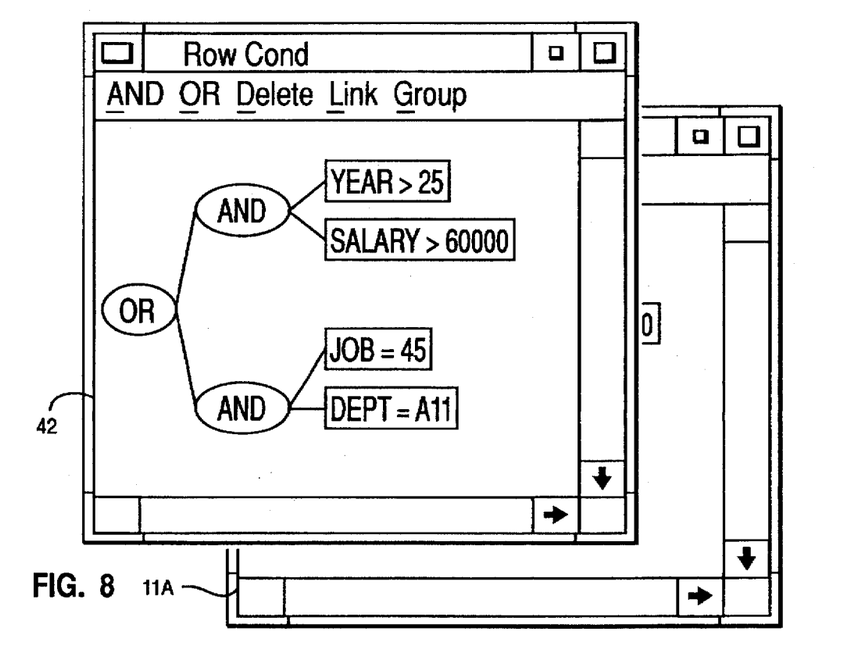
FIG. 8 is an illustration of the user interface of the present invention after selection of one of the features depicted in FIG. 6 triggering destruction of dynamically created icon(s)

Yet another illustration of such a criteria calling for automatically and dynamically extinguishing or removing the dynamically-created scroll icons or arrow(s) relates to the fact that, in modern graphical user interfaces, it is also conventional to provide for simultaneous opening, and display of multiple windows. Thus, as shown in FIG. 7, one such windowed area 11A might simultaneously be displayed in the foreground of display screen 10 along with a secondary windowed area 42 in the background. The dynamically created scroll arrows may have been effected during the user's activity with the foreground window 11A. However, upon thereafter bringing the secondary window 42 into the foreground by various means (as shown in FIG. 8), such as by clicking on the secondary window, or the like, this may indicate that the previous scrolling activity being conducted in the window 11A of FIG. 7 is no longer thereafter desired. In such case, the scroll icon(s) in window 11A (such as arrow 32 of FIG. 7) dynamically created in accordance with the invention would be made to dynamically disappear from their corresponding scroll bar as shown in FIG. 8.

Yet an additional and illustrative indication of representative criteria in which it may be desirable to dynamically and automatically cause the dynamically-created scroll arrows to be thereafter removed from the scroll bar may be understood, with reference to FIG. 7. The cursor 2 is shown positioned in window 11 at a distance X from a dynamically created scroll arrow pair 27–32. Such a criteria might be that if the user has thus positioned the cursor 2 at a distance greater than some predefined distance X away from the dynamically created scroll arrow pair 27–32, this may indicate that the user no longer desires to continue conducting scrolling activity. Upon the system of the invention detecting this, this may be yet another criteria for causing the automatic removal of the dynamically created scroll arrow, in this case upward dynamic scroll arrow 32.

In accordance with the foregoing with relation to FIGS. 7 and 8, three such criteria have been illustrated for desirably causing the automatic and dynamic removal of the previously dynamically created scroll arrow(s), namely activating a pull-down menu or overlayed window, or traversing beyond a preselected distance from dynamic scroll icon pairs. However, the invention is not intended to be so limited and admits to numerous other such criteria which may be monitored as desired and detected by the user interface system for triggering dynamic destruction of the dynamically created scrolling arrows. The generalized notion is that the user interface system of the present invention may monitor user activity for any desired criteria which would, in all probability, be likely to indicate the user desired to exit from a predominantly very fine scrolling mode for a significant period of time, wherein it would thus be most appropriate to remove the dynamically-created scrolling arrows so as to free up valuable and limited display screen area. Such freeing up would be for purposes of allowing a locator 31, for example, more distance to travel to improve less granular scrolls.

It is further contemplated in the invention that such criteria need not be fixed or variable but rather may themselves be dynamically adaptable as a function of building a history of user activity and characteristics. As but one example, an invariant criteria that any time the user has positioned a cursor to a distance greater than X from a scroll arrow pair would invoke destruction of a scroll arrow might be unduly inflexible, leading to decisions to remove dynamically created arrows which may be inappropriate.

For example, the user may cause the cursor to traverse a distance greater than X but only for a very limited time or limited number of user actions whereupon the user may desire to re-enter the scrolling mode. By providing for monitoring, recoding, and analyzing user habits, etc. and dynamically developing user and application profiles, such use may be taken into account by the system, whereby destruction or removal of the dynamic arrows in accordance with a more intelligent and flexible criteria is thus be provided. As but one example, if the user exceeds this distance X but only for a limited period or for a limited number of interactions with the user interface, and then the cursor is repositioned more proximally to the arrow pair, the system might desirably forego destruction of the dynamic arrows in anticipation that notwithstanding temporary traversal beyond the distance X, the user in fact was generally still in more of a scrolling mode.

Figure 9:
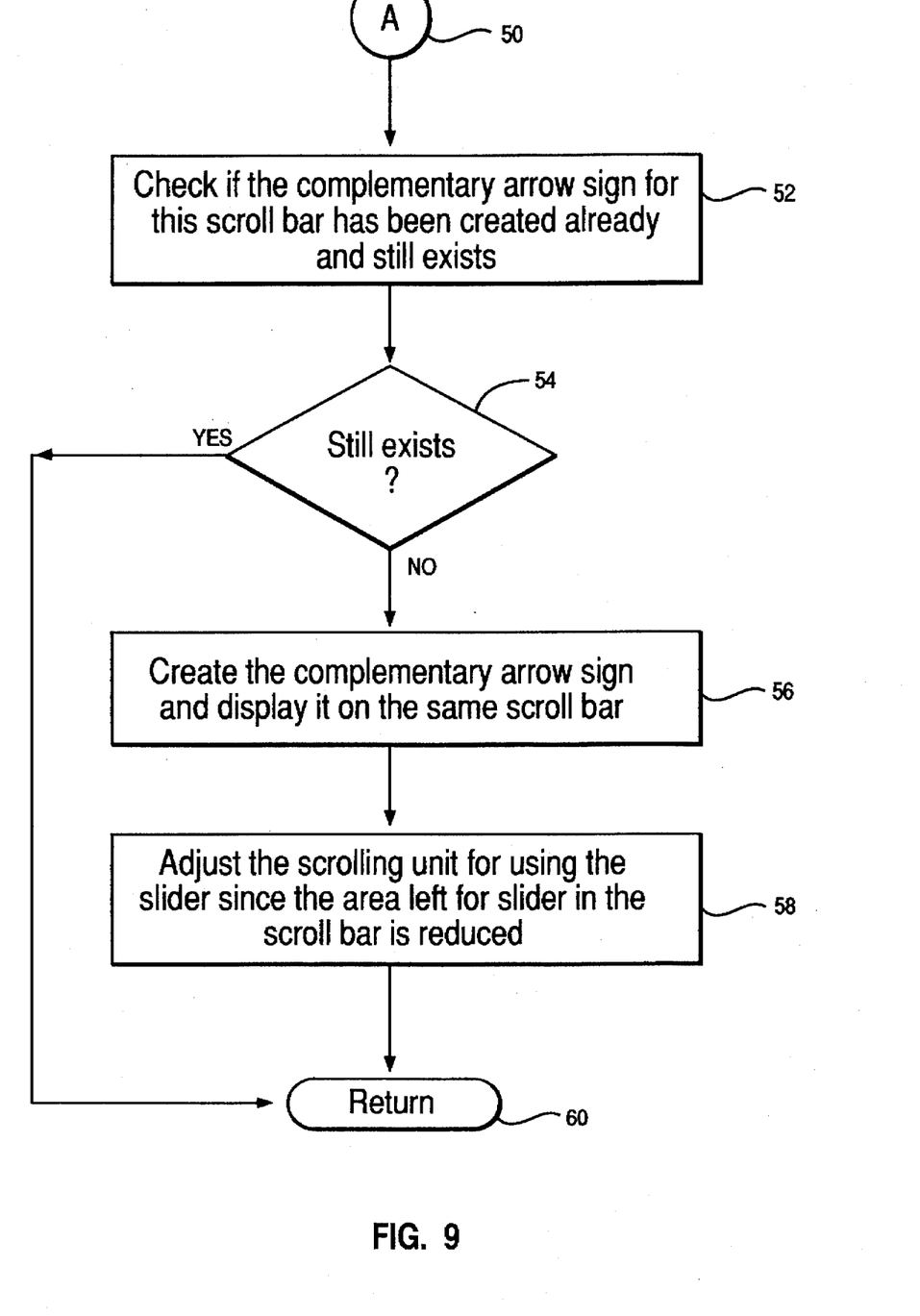
FIG. 9 is a flow diagram of a typical computerized program implemented with the system of FIG. 1 to effect creation of scrolling features in accordance with the present invention.

Turning now to FIG. 9, a schematic illustration of a flow diagram implementing the aforementioned methods and techniques for dynamically creating scroll icons may be seen depicted. It will be readily appreciated that these functional blocks may preferably be implemented in some form of user interface software implemented in conjunction with the computer system of FIGS. 1 and 2 such as in laptop or notebook computer operating system or application programs.

Turning now to FIG. 9, it will be recalled that the computer system of FIGS. 1–2 includes program code 6 for monitoring the position of the cursor 2 positioned by a pointing device as desired. However, the system further includes program code for generating, as a function of this monitoring, dynamic scroll icons, positioning, and extinguishing them from the display screen 10 at appropriate times in accordance with the criteria described herein.

FIG. 9 illustrates a representative flow diagram which may be implemented in program code for causing the desired dynamic creation of scroll icons such as arrows or the like in accordance with the invention. A subroutine A is entered, shown at reference numeral 50, whenever the computer system of FIG. 1, through the I/O function 8, determines activity on the system bus arising is present from a user input from a device 3A–3D (other than cursor positioning indicating an action is desired). Such a user input might be comprised of a button click on a track ball of a notebook computer or the like. Once this user input has been detected, the computer system will determine, by means of the program 6 and working memory 7, if the complementary dynamically-created scroll icon (such as an arrow sign or the like) for a scroll bar was already previously created and still in existence on the display screen 10 after such user input or clicking activity on or adjacent the given scroll bar, shown by step 52. If, in response to such status check, the computer system determines that such complementary icon still exists, then there is no need to create such icon in response to the user I/O, and thus, after determining that it still exists, program flow exits the decision box 54 to the left returning at reference numeral 60 to the calling program.

On the other hand, if in response to the check at decision box 54, it is determined that, in response to the user input indicating dynamic creation of a scrolling icon is warranted (because of user input on or adjacent a statically created and pre-existent scrolling icon but no prior creation of a dynamic icon), program flow will exit the "No" path of box 54. This time, the computer system under program control implementing the invention will cause, at reference numeral 56, the desired creation of the complementary scroll icon such as in the form of the complementary arrow sign and will cause display of this icon on the scroll bar of the display 10 at an appropriate location. It will be recalled from the foregoing, that one criteria for indicating the need to create the dynamic arrow is user input activating a prior statically displayed arrow indicating that the user is in a use mode wherein scrolling is desired. This is an example of when the complementary arrow sign would be produced in accordance with box 56 after, of course, the program has completed an existence check (reference numeral 52–54) to ensure that the dynamic arrow is not already in existence.

Continuing with FIG. 9, after creation of the complementary dynamic arrow sign per step 56, the computer system of FIGS. 1–2, under program control, will automatically adjust the scrolling unit of the particular pointing device (e.g. the granularity) to be appropriate for use of the locator in the scroll bar in which the static and thus-dynamically created arrows occur. This is because the area left for the locator in the scroll bar, by reason of the creation of the dynamic new arrow, has accordingly been reduced thereby also reducing the area available for operation of the locator. After such adjustment at 58, the subprogram thereafter executes a return 60 to the calling program.

Figure 10:
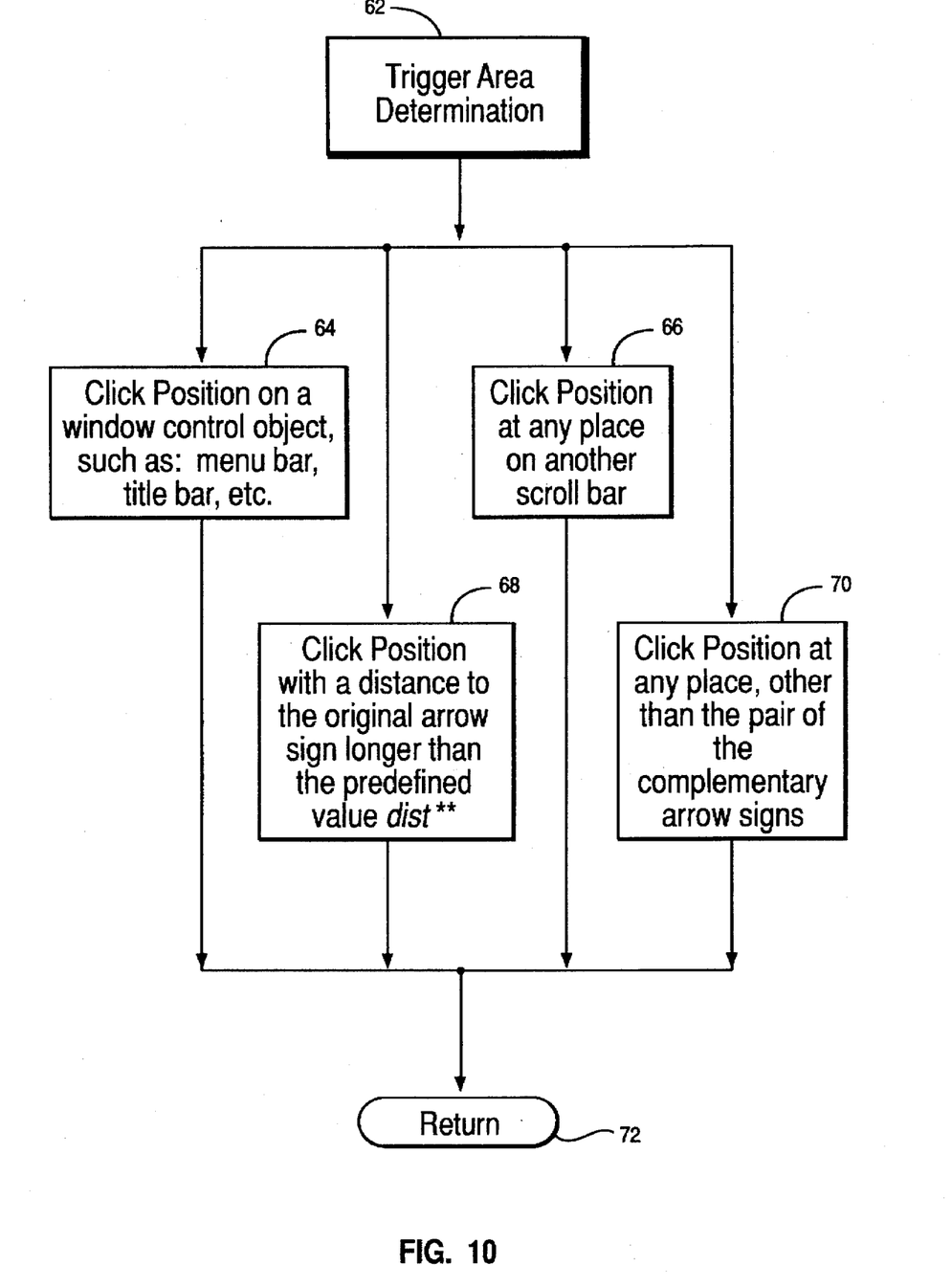
FIG. 10 is a flow diagram of a typical computerized program implemented with the system of FIG. 1 for effecting definition of trigger areas in accordance with the scrolling features of the present invention.

Turning now to FIG. 10, there will be seen depicted therein, an illustrative flow diagram illustrating the definition of a trigger area for causing destruction of dynamic scroll icons in accordance with the teachings of the invention.

Continuing now to FIG. 10, it will further be recalled from the foregoing that it is a feature of the invention to automatically detect criteria under which it is desirable to extinguish or remove the previously dynamically-created scrolling icon from the external user interface in order to thereby free up additional space on the display and the scroll bar for use by the slider.

Turning now to FIG. 10, this is a functional illustration of appropriate program code executed by the computer system FIG. 1–FIG. 2 of the invention for performing this automatic determination of the need to extinguish dynamically created scrolling icons. When the trigger area determination subroutine 62 is entered, the computer system will monitor user input from the pointing device which may comprise either the user positioning the cursor 2 in a particular location, user activation of a function on the pointing device such as activating a click or a button or the like, or a combination of both, which will indicate that the user is exiting a predominantly scrolling mode thereby in turn indicating that extinguishment of the dynamic scroll icons is warranted.

More particularly, with reference to FIG. 10, the system may detect user input 64 such as clicking on a position on a window control object such as the aforementioned menu bar 14 of FIG. 3, title bar, or the like. Similarly, shown at reference numeral 66 is an automated computer check detecting that the user has positioned the cursor 2 at another place along another scroll bar. Similarly, at reference numeral 68, there is represented an automatic computer check of user input detecting that the user has positioned the cursor 2 at a distance from the original scrolling cursor previously activated to cause creation of a dynamic scroll icon which is longer than a predefined value "dist". Such dist will readily be recognized as aforementioned distance X in FIG. 7.

Finally, with reference to FIG. 10, an additional check may be provided at box 70 detecting when user input has selected a location on the display 10 other than at the pair of complementary arrow signs which were created when the user previously activated a static scroll icon. Rationale behind this check is that when a user enters a scroll mode by clicking on a statically present arrow, if the intent is to remain in a scrolling mode, the user will thereafter alternately activate the static arrow and the dynamically created arrow (created automatically upon activation of the static arrow), thereby effecting a scrolling backwards and forwards as desired during the scrolling mode. However, when the user thereafter activates or clicks at a location other than on or adjacent to the dynamic arrow pair, this may indicate activity suggesting the user has left the scrolling mode, in which case extinguishing the dynamically-created arrow is appropriate.

Figure 11:
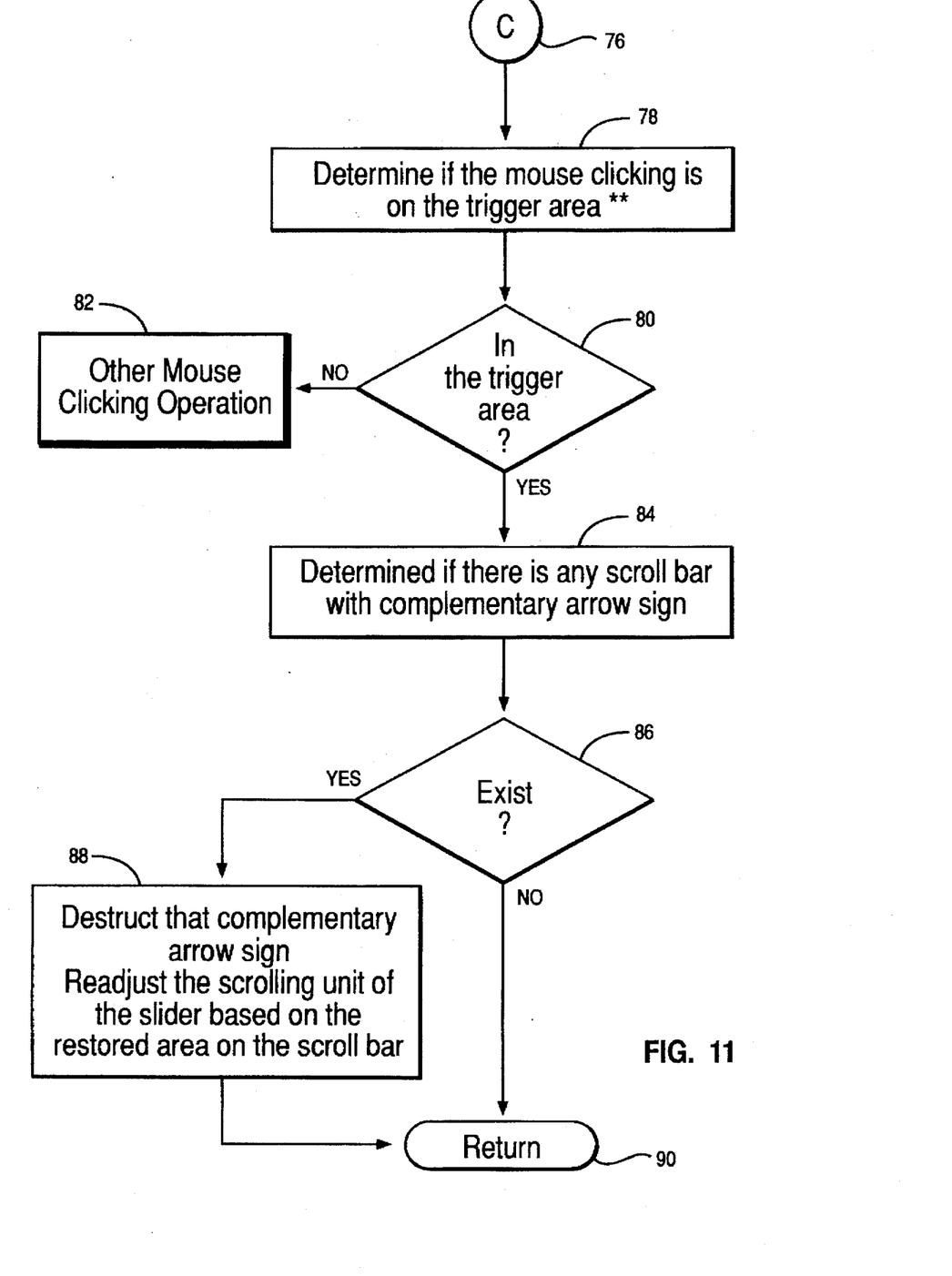
FIG. 11 is a flow diagram of a typical computerized program implemented by the system of FIG. 1 for effecting destruction of the scrolling features of the present invention.

Turning now to FIG. 11, with the foregoing description in mind of representative criteria in FIG. 10 indicating a "trigger area" which should cause automatic extinguishment of a dynamically-created scrolling icon, FIG. 11 is intended to indicate a flow diagram of appropriate code for causing dynamic and automatic destruction of such dynamically created icons upon the triggering event of FIG. 10 occurring. Specifically, the subroutine is entered at reference numeral 76 of FIG. 11 whereupon the system detects if user input such as mouse or track ball clicking has occurred on the trigger area defined in FIG. 10, as shown at reference numeral 78. In response to the check of whether the user activity is in the trigger activity area 78 at reference numeral 80, if it is not, it is determined, as shown at reference numeral 82 that another mouse clicking operation has occurred which will thereafter be executed. However, in response to an affirmative check at 80 indicating user input has occurred in the trigger area criteria, program flow will exit box 80 downward to a test, at reference numeral 84, of whether a scroll bar exists with a previously-dynamically-created complementary scrolling icon. If the test is positive, as shown by the "yes" exit to the left of control box 86, (thereby indicating that the scroll bar with the complementary arrow sign exists), the functions at box 88 will be executed. These include the destruction or removal from the visual display of the complementary arrow sign, and thereafter readjustment of the scrolling unit of the slider on the scroll bar to the appropriate value based upon the area thereby restored on the scroll bar after removal of the dynamically-created arrow sign. On the other hand, in response to a negative indication at the test 86, the system will simply return at reference numeral 90 to the calling routine.

Whereas the embodiments of the invention previously described have shown particular forms of dynamically created icons, such as arrows occurring in scroll bars at particular locations on the perimeter of windows, it will be readily apparent that the invention is not intended to be so limited. Thus, the invention admits to other forms, for example those wherein a scrolling icon may appear essentially anywhere on the display area which, when activated, will cause dynamic creation of a complementary scrolling icon adjacent thereto even without the presence of a scroll bar, arrow indicators, and the like.

In like manner, although a particular embodiment has disclosed a limited number of specific pre-determined criteria for causing extinguishment or removal of the dynamically created icon, the invention is not intended to be so limited. Other criteria, depending upon characteristics of the user's habits of use, application programs, and the like may dictate yet other criteria which may be built into the system for detecting appropriate times to dynamically create, extinguish or remove the dynamically created icon. Moreover, as previously indicated, these criteria may be desirably, in some instances, complex functions of a number of parameters and/or sequences of prior user input. It may be further even be desirable to vary these criteria dynamically depending upon the application being run, and to vary even the time period of previous activity for dynamically arriving at these criteria, which may be stored and recalled themselves dynamically during continued user input.

While the invention has been shown and described with reference to particular embodiments thereof, it will be understood by those skilled in the art that the foregoing and other changes in form and detail may be made therein without departing from the spirit and scope of the invention.

I claim:

1. A method for improving user interactions with a computerized visual display having at least a first icon and a corresponding user actuatable first function, comprising
    monitoring and storing a history of at least two different said user interactions comprising a criteria;
    selecting said first icon;
    automatically creating a second icon on said display adjacent said first icon in response to said selecting said first icon having a corresponding user-actuatable second function related to said first function, wherein said first and second functions correspond to a scrolling of data or graphics in a corresponding first and opposing second direction on said display, respectively, and wherein said first and second icons are indicators of said first and second direction, respectively;
    monitoring said user interactions after said automatically creating said second icon;
    detecting when use of said first and second functions will not be required by comparing said criteria with said user interactions monitored after said automatically creating said second icon; and
    automatically removing said second icon from said display in response to said detecting.

2. The method of claim 1 including
    predefining at least two different said user interactions from said history prior to said selecting said first icon; and
    wherein said detecting step further comprises
        detecting from said comparing when said user interaction after said creating said second icon corresponds to said predefined at least two different said user interactions from said history.

3. The method of claim 2 wherein said predefined at least two different said user interactions from said history includes
    a user action after said automatic creation of said second icon at a location on said display exceeding a predefined distance from said first icon.

4. The method of claim 2 wherein said display includes at least one user actuatable pull-down or pop-up menu and wherein said predefined at least two different said user interactions comprises user actuation of said at least one pull-down or pop-up menu.

5. The method of claim 2 wherein said display includes a plurality of windows; and said predefined at least two different said user interactions comprises user interaction with a first of said windows after said activation of said first icon; and user actuation of a second of said windows
    after said interaction with said first window and before said removing of said second icon.

6. The method of claim 2 further including the steps of executing a computer application displaying on said visual display;

wherein said selecting said first icon is in response to said executing; and wherein said predefined at least two different said user interactions are predefined as a function of said executing computer application.

7. Apparatus for improving user interactions with a computerized visual display having at least a first icon and a corresponding user actuatable first function, comprising means for monitoring and storing a history of at least two different said user interactions comprising a criteria;

means for selecting said first icon;

means for automatically creating a second icon on said display adjacent said first icon in response to said selecting said first icon having a corresponding user-actuatable second function related to said first function, wherein said first and second functions correspond to a scrolling of data or graphics in a corresponding first and opposing second direction on said display, respectively, and wherein said first and second icons are indicators of said first and second directions, respectively;

means for monitoring said user interactions after said automatically creating said second icon;

means for detecting when use of said first and second functions will not be required by comparing said monitored and stored history of said user interactions with said user interactions monitored after said automatically creating said second icon; and means for automatically removing said second icon from said display in response to said detecting.

8. The apparatus of claim 7 including means for predefining at least two different said user interactions from said history prior to said selecting said first icon; and wherein said means for detecting further comprises
    means for detecting from said comparing when said user interaction after said creating said second icon corresponds to said predefined at least two different said user interactions from said history.

9. The apparatus of claim 8 wherein said predefined at least two different said user interactions from said history includes a user action after said automatic creation of said second icon at a location on said display exceeding a predefined distance from said first icon.

10. The apparatus of claim 8 wherein said display includes at least one user actuatable pull-down or pop-up menu and wherein said predefined at least two different said user interactions comprises user actuation of said at least one pull-down or pop-up menu.

11. The apparatus of claim 8 wherein said display includes a plurality of windows; and said predefined at least two different said user interactions comprises user interaction with a first of said windows after said activation of said first icon; and user actuation of a second of said windows
    after said interaction with said first window and before said removing of said second icon.

12. The apparatus of claim 8 further including:

means for executing a computer application displaying on said visual display;

wherein said selecting said first icon is in response to said executing; and wherein said predefined at least two different said user interactions are predefined as a function of said executing computer application.

* * * * *